United States Patent [19]

Lipkin et al.

[11] Patent Number: 4,662,995
[45] Date of Patent: May 5, 1987

[54] DISTILLATION PROCESS

[75] Inventors: Gregory M. Lipkin; Byron C. Lynch, both of Baton Rouge, La.

[73] Assignee: Exxon Research and Engineering Company, Florham Park, N.J.

[21] Appl. No.: 748,728

[22] Filed: Jun. 25, 1985

[51] Int. Cl.[4] .............................................. B01D 3/14
[52] U.S. Cl. ....................................... 203/98; 203/99; 203/DIG. 18; 203/DIG. 19; 202/156; 202/172; 208/355
[58] Field of Search .................... 203/98, 99, DIG. 19, 203/DIG. 18, 91, 1, 2; 208/355; 202/156, 172, 160

[56] References Cited

U.S. PATENT DOCUMENTS

| | | | |
|---|---|---|---|
| 1,952,639 | 3/1934 | Thiele | 208/355 |
| 2,175,817 | 10/1939 | Slawson | 208/358 |
| 2,222,583 | 11/1940 | Kraft | 208/354 |
| 2,736,688 | 2/1956 | Kraft | 203/84 |
| 3,210,271 | 10/1965 | Byerly et al. | 208/355 |
| 3,301,778 | 1/1967 | Cabbage | 208/356 |
| 3,310,487 | 3/1967 | Johnson et al. | 208/355 |
| 4,239,618 | 12/1980 | Peiser et al. | 208/356 |
| 4,274,944 | 6/1981 | Bannon | 208/355 |

FOREIGN PATENT DOCUMENTS 0132268 9/1978 Fed. Rep. of Germany ... 203/DIG. 19

OTHER PUBLICATIONS

Dickey et al, "Figure Separations This New Way", Hydrocarbon Processing & Petroleum Refiner, Feb. 1962, vol. 41, No. 2, pp. 143–150.

Primary Examiner—S. Leon Bashore
Assistant Examiner—V. Manoharan
Attorney, Agent, or Firm—Edward H. Mazer; Joseph J. Allocca

[57] ABSTRACT

A method and apparatus for improving the separation of a distillation system comprising a main distillation zone and at least one sidestream separation zone is described. The method comprises returning vapor separated in the sidestream separation zone to the main distillation zone at a location at least two trays and/or at least one theoretical stage above the liquid draw-off from the main distillation zone to the sidestream separation zone.

6 Claims, 1 Drawing Figure

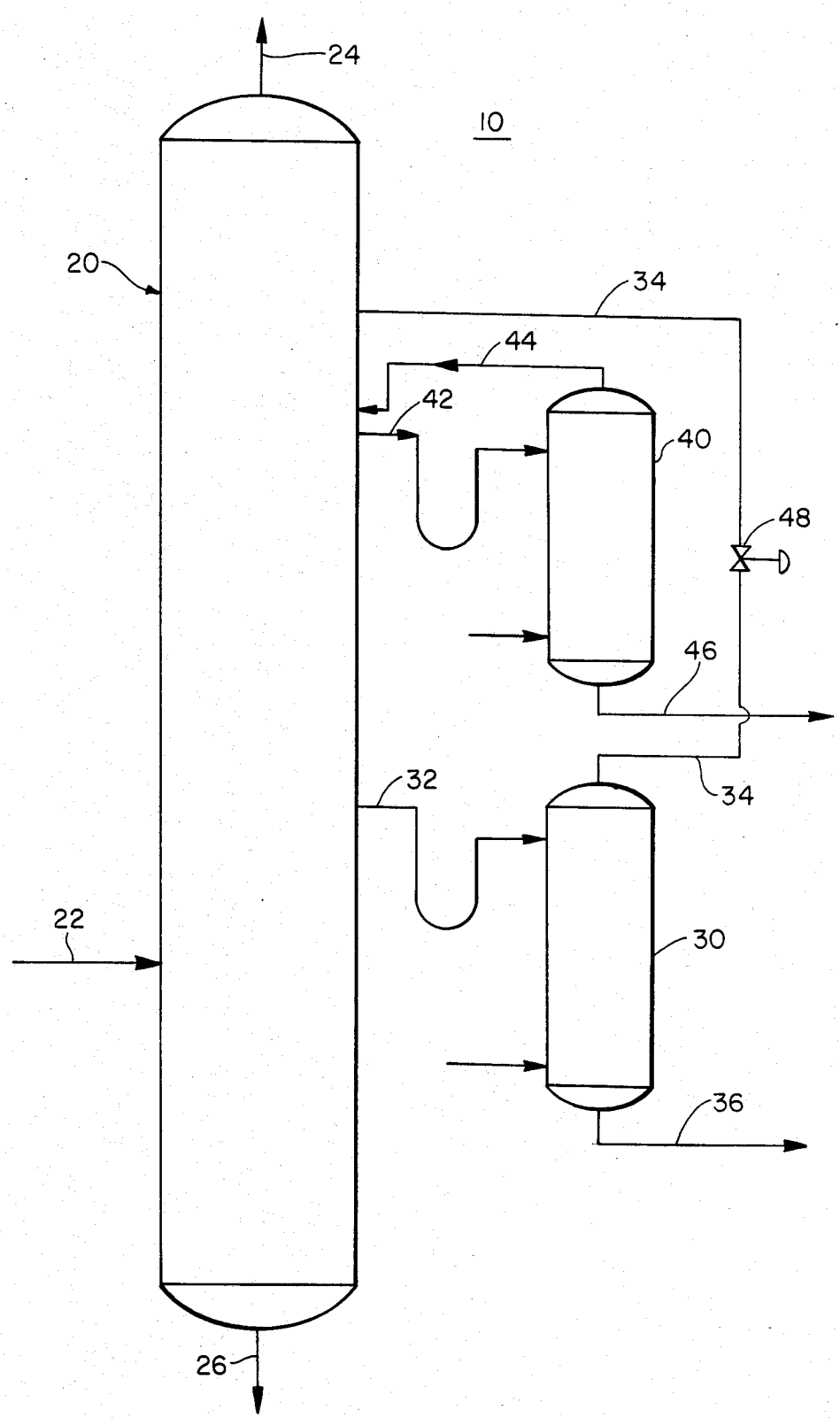

DISTILLATION PROCESS

BACKGROUND OF THE INVENTION

The present invention is directed at an improved distillation process. More specifically, the present invention is directed at a method for increasing the yield of certain distillate fractions in a distillation system having a sidestream stripping zone.

In the separation of feeds such as hydrocarbon feeds into distillate fractions and a bottoms fraction, frequently it is desirable to maximize the production of one fraction. In distillation processes frequently a sidestream distillation zone, such as a sidestream stripper, is added to the column to facilitate the separation of the lighter fractions from the heavier fractions. Typically, the stripped out materials along with steam return to the main tower at the same tray or at a tray immediately above the liquid draw-off. However, changes in the feed composition, reflux ratio and/or product slate from that originally contemplated during the design of the distillation system may result in the operation of the system being non-optimal. For example hydraulic bottlenecks in the system often decrease the efficiency of the distillation system.

U.S. Pat. No. 3,210,271 discloses a distillation system having a main distillation zone and a sidestream stripping zone. Separated condensate is returned from the sidestream stripping zone to the main distillation zone through one of a plurality of inlets immediately above or below the liquid draw-off for the sidestream stripping zone.

U.S. Pat. No. 3,310,487 discloses a fractionation system employing a plurality of sidestream stripping zones in combination with a main distillation zone to process crude oil. The vapor fractions from the sidestream stripping zones are returned to the main distillation zone directly above the sidestream draw-off for that respective stripping zone.

Accordingly, it is desirable to provide a process to increase the flexibility of a distillation system having a sidestream stripping system.

It also would be desirable to provide a process which could improve the efficiency of the distillation system and thereby increase the production of desired distillate fractions.

The present invention is directed at improving the efficiency of certain distillation systems to thereby increase the production of select distillate fractions by returning the separated fraction from one sidestream separation zone to the main distillation zone at a location at least two trays and/or at least one theoretical stage above the tray from which the sidestream was withdrawn from the main distillation zone. In a preferred embodiment, at least a fraction of the material separated in the sidestream separation zone is returned to the main distillation zone at a location above that at which a lighter sidestream is withdrawn from the main distillation zone.

SUMMARY OF THE INVENTION

The present invention is directed at an improved method for separating a feed into a plurality of fractions utilizing a distillation system comprising:

A. a main distillation zone into which feed is introduced and from which separated fractions are removed;

B. a sidestream separation zone communicating with the main distillation zone through a sidestream draw-off disposed at an intermediate location on the main distillation zone, said sidestream separation zone adapted to separate an intermediate feed stream from the main distillation zone into a vapor fraction and a liquid fraction, wherein the improvement comprises returning the vapor fraction to the main distillation zone at a location at least two trays, and/or at least one theoretical stage above the respective sidestream draw-off to the same sidestream separation zone.

The present invention also is directed at a distillation system comprising:

A. a main distillation zone adapted to separate feed into an overhead fraction and a bottoms fraction;

B. a first sidestream separation zone communicating with said main distillation zone through a first sidestream draw-off disposed at an intermediate location on the main distillation zone, said first sidestream separation zone adapted to separate an intermediate feed stream into a first sidestream vapor fraction and a first sidestream liquid fraction, first sidestream vapor fraction returned to the main distillation zone through a first sidestream return line;

C. a second sidestream separation zone communicating with said main distillation zone through a second sidestream draw-off disposed at a location on the main distillation zone above said first sidestream draw-off, said second sidestream separation zone adapted to separate an intermediate feed stream into a second sidestream vapor fraction and a second sidestream liquid fraction, second sidestream vapor fraction returned to the main distillation zone through second sidestream return line, the improvement wherein said first sidestream return line communicates with said main distillation zone at a location above that at which the second sidestream draw-off line communicates with said main distillation zone.

In a preferred embodiment vapor fraction is returned to the main distillation zone at least 2 trays above the respective side draw-off, more preferably, at least 4 trays above the respective side draw-off where a trayed distillation zone is used. Where a packed distillation zone is utilized, vapor fraction is returned at least one theoretical stage above the side draw-off, preferably at least two theoretical stages above the respective side draw-off.

A preferred distillation system comprises a main distillation zone and a plurality of sidestream separation zones. In a preferred embodiment wherein the distillation system comprises first and second sidestream separation zones with the second sidestream draw-off disposed above that for the first sidestream draw-off, vapor fraction is returned from the first sidestream separation zone above the sidestream draw-off for the second sidestream separation zone.

In a preferred embodiment first intermediate, or sidestream, vapor return line has a control means disposed therein to regulate the flow rate therethrough by regulating the pressure drop in the return line.

BRIEF DESCRIPTION OF THE DRAWING

The FIGURE represents a simplified schematic drawing of one embodiment of the present invention.

DETAILED DESCRIPTION OF THE INVENTION

The present invention is directed at a method for improving the separation in a distillation system having a main distillation zone and at least one sidestream separation zone, preferably a plurality of sidestream separation zones.

Referring to the FIGURE, one embodiment for practicing the present invention is shown. In this FIGURE all equipment, valves and instrumentation not essential for a complete understanding of the invention has been eliminated. Distillation system 10 is shown comprising main distillation zone 20, first sidestream separation zone 30, and second sidestream separation zone 40. Feed 22 is shown entering distillation zone 10 where a portion of the feed is separated into a distillate, or overheads fraction 24, and a bottoms fraction 26. Intermediate fractions, such as intermediate liquid fractions, may be removed from distillate zone 20, such as through first sidestream draw-off 32 and second sidestream draw-off 42, to transfer first and second intermediate fractions to first sidestream separation zone 30 and second sidestream separation zone 40, respectively. In sidestream separation zone 30, the first intermediate fraction is separated into a first intermediate distillate, or first intermediate vapor fraction, exiting zone 30 through line 34 and a first intermediate bottoms fraction exiting zone 30 through line 36. Similarly, sidestream separation zone 40 separates the second intermediate fraction into a second intermediate distillate, or second intermediate vapor fraction, exiting zone 40 through line 44, and a second intermediate bottoms fraction exiting zone 40 through line 46. In this FIGURE, bottoms fractions exiting through lines 36, 46, from sidestream separation zones 30, 40, respectively, are shown being removed from the distillation system 10 for further processing while vapor fractions exiting through lines 34, 44, from sidestream separation zones 30, 40, respectively, are shown being returned to main distillation zone 20. In a conventional distillation system first intermediate, or sidestream, vapor return line 34 and second intermediate vapor return line 44, each would return the vapor to the same tray as the respective draw-offs 32, 42, respectively, or perhaps one tray above the respective draw-offs. A critical element of the present invention resides in the return of at least one of the intermediate return lines a substantial distance above the respective draw-off. In the FIGURE, first intermediate vapor return line 34 is shown being returned to main distillate zone 20 above the location at which second draw-off 42 communicates with the main distillation zone. Second intermediate return line 44 is shown being returned to the same tray as second intermediate draw-off 42. However, it also is within the contemplation of the invention that second intermediate return line 44 could return second intermediate vapor fraction a substantial distance above the second sidestream draw-off, such as above the location at which third sidestream draw-off (not shown) communicates with main distillation zone 20.

A pressure control means, such as valve 48, is shown being located in line 34 to control the volume of hydrocarbons passing through line 34. In a preferred embodiment, the pressure drop across valve 48 and line 34 will approximate the pressure drop of vapor passing for an equivalent distance upwardly through the main distillation zone 20. In the example described hereafter, the pressure drop across valve 48 and line 34 was approximately 1 psi. The pressure drop is controlled in line 34 to track the pressure drop in the corresponding section of main distillation zone 20.

The present invention is of utility in improving the separation in columns which may be hydraulically limited at some point. While the present invention has particular utility in petroleum refining distillation systems, where main distillation zone 20 typically may range from about 12 to about 20 feet in diameter with 25 to 55 trays, and about 2 to about 5 sidestream separation zones, the present invention also may be applicable to other systems having a main distillation zone and at least one, preferably at least two, sidestream separation zones. Although main distillation zone 20 is shown as being a trayed column, the present invention would be applicable to other columns, such as a packed column, or any other similar vapor-liquid contacting device.

In the embodiment shown in the FIGURE, sidestream separation zones 30, 40 comprise trayed and/or packed columns in which steam typically is added to strip off the more volatile fraction from the intermediate fractions removed from main distillation zone 20 through sidestream draw-offs 32, 42. The present invention would be equally applicable to sidestream separation zones using an indirect source of heat, such as a reboiler.

The present invention is directed at a system in which the vapors returned to main distillation zone 20 from sidestream separation zones 30, 40, is added at least two trays, preferably at least about 4 trays above the respective draw-off where a trayed column is used, or at least one theoretical tray, preferably at least two theoretical trays, above the respective draw-off where a packed column is utilized. In a particularly preferred embodiment, where at least two sidestream separation zones are utilized, vapor from first sidestream separation zone 30 is returned through line 34 to main distillation zone 20 above the point at which second sidestream is withdrawn from the main distillation zone through line 42.

The following Comparative Example and Example demonstrate the utility of the present invention in improving the separation of relatively light components, jet fuel and diesel fuels from a crude oil feed stream.

COMPARATIVE EXAMPLE

An atmospheric distillation column was utilized to distill a blend of South Louisiana and Alaskan crudes introduced at a feed rate of about 8000 barrels per hour into a main distillation zone with diameters of 20 and 16 feet having 55 trays with a 2 foot tray spacing and a bottoms temperature of 360° C. The feed was introduced onto the fifth tray from the bottom. Five sidestream stripping zones designated as sidestream stripping zones 1, 2, 3, 4 and 5, were located on the column, with draw-offs at the 9th, 17th, 27th, 35th, and 46th trays, respectively, from the bottom. The vapor fraction from each sidestream stripping zone was returned to the same tray as the draw-off for the respective sidestream stripping zone. The liquid fractions from sidestream stripping zones 1, 2, 3, 4 and 5 constituted the heavy gas oil, light gas oil, diesel fuel, jet fuel and sidestream naphtha fractions, respectively. The relative amounts of these fractions, as well as the overhead naphtha fraction and bottoms fraction is presented in Table I.

EXAMPLE 1

In this Example, the same distillation system was utilized with the same crude oil feed as in the Comparative Example. The feed rate, reflux rate, bottoms temperature and steam addition rates to the stripping zones also were substantially similar to those in the Comparative Example. In this Example, the liquid draw-off for the light gas oil stripping zone, zone 2 was maintained at the 17th tray from the bottom as in the Comparative Example. However, the vapors stripped off in the light gas oil stripping zone, zone 2 were returned to the 28th tray from the bottom, substantially above the 17th tray draw-off and even above the draw-off and return for the next higher separation zone, zone 3 comprising the diesel fuel stripping zone. As shown in Table 1, returning the vapor fraction from the light gas oil stripping zone to a tray above the draw-off and return for the diesel fuel separation zone increased the quantity of certain desired fractions, jet fuel and diesel fuel, by approximately 10% while reducing the less desired light gas fraction by a similar amount.

TABLE I

| | PERCENT VOLUME ON FEED OF SEPARATED CRUDE OIL FRACTIONS | | | | | | |
|---|---|---|---|---|---|---|---|
| | Overhead Naptha | Fifth Side-Stream Side-Stream Naphtha | Fourth Side-Stream Jet Fuel | Third Side-Stream Diesel Fuel | Second Side-Stream Light Gas Oil | First Side-Stream Heavy Gas Oil | Bottoms |
| Comparative Example | 9.0 | 4.0 | 11.5 | 6.0 | 17.5 | 7.0 | 45 |
| Example | 9.0 | 4.0 | 12.7 | 6.6 | 15.7 | 7.0 | 45 |
| % Change* | 0 | 0 | +10.4 | +10.0 | −10.3 | 0 | |

*$\frac{(Example - Comp.\ Example)}{Comp.\ Example} \times 100\%$

What is claimed is:

1. A method for separating a hydrocarbon feed into a plurality of fractions in a distillation system, said method comprising:
   A. introducing hydrocarbon feed into a main distillation zone to separate the hydrocarbon feed into fractions having differing boiling points;
   B. removing a first intermediate fraction from the main distillation zone through a first draw-off and separating the first intermediate fraction into a first intermediate vapor fraction and a first intermediate liquid fraction;
   C. removing a second intermediate fraction from the main distillation zone through a second draw-off communicating with the main distillation zone at a location above that at which the first draw-off communicates with the main distillation zone; and
   D. returning first vapor fraction to the main distillation zone at a location above that at which the second draw-off communicates with the main distillation zone.

2. The method of claim 1 further comprising regulating the flow of first vapor fraction through the first sidestream return line by a control means disposed therein.

3. The method of claim 2 further comprising returning first vapor fraction to the main distillation zone at least two theoretical trays above the location at which the first draw-off communicates with the main distillation zone.

4. In a distillation system comprising:
   A. a main distillation column for separating feed into an overhead and a bottoms fraction;
   B. a first sidestream separator communicating with said main distillation column through a first sidestream draw-off means disposed at an intermediate location on the main distillation column, said first sidestream separator being means for separating an intermediate feed stream drawn from said main distillation column into a first sidestream vapor fraction and a first sidestream liquid fraction;
   C. first sidestream vapor return line means by which said first sidestream vapor fraction is returned to the main distillation column;
   D. a second sidestream separator communicating with said main distillation column through a second sidestream draw-off means disposed at a location on the main distillation column above said first sidestream draw-off means, said second sidestream separator being means for separating an intermediate feed stream drawn from said main distillation column into a second sidestream vapor fraction and a second sidestream liquid fraction; and
   E. second sidestream vapor return line means by which said second sidestream vapor fraction is returned to the main distillation column, the improvement wherein said first sidestream vapor return line means communicates with said main distillation column at a location above that at which the second sidestream draw-off means communicates with said main distillation column.

5. The distillation system of claim 4 further comprising a control means disposed in said first sidestream return line, said control means regulating the pressure drop in said side stream return line.

6. The distillation system of claim 5 wherein said first sidestream return line communicates with said main distillation column at least two theoretical trays above the sidestream draw-off to the same sidestream separation zone.

* * * * *